United States Patent
Bonczkowski et al.

(10) Patent No.: US 9,916,225 B1
(45) Date of Patent: Mar. 13, 2018

(54) COMPUTER IMPLEMENTED SYSTEM AND METHOD AND COMPUTER PROGRAM PRODUCT FOR TESTING A SOFTWARE COMPONENT BY SIMULATING A COMPUTING COMPONENT USING CAPTURED NETWORK PACKET INFORMATION

(71) Applicant: VCE Company, LLC, Richardson, TX (US)

(72) Inventors: Joshua L Bonczkowski, Apex, NC (US); Nicholas A Hansen, Willow Spring, NC (US); Steven R Hart, Garner, NC (US); Pierre Ancelot, Ballincollig (IE)

(73) Assignee: VCE IP Holding Company LLC, Richardson, TX (US)

( * ) Notice: Subject to any disclaimer, the term of this patent is extended or adjusted under 35 U.S.C. 154(b) by 84 days.

(21) Appl. No.: 15/191,087

(22) Filed: Jun. 23, 2016

(51) Int. Cl.
G06F 9/44 (2006.01)
G06F 11/36 (2006.01)
H04L 12/24 (2006.01)
H04L 12/26 (2006.01)

(52) U.S. Cl.
CPC ...... *G06F 11/3664* (2013.01); *G06F 11/3668* (2013.01); *H04L 41/145* (2013.01); *H04L 43/04* (2013.01)

(58) Field of Classification Search
CPC .................................................. G06F 11/3664
USPC ........................................................ 717/135
See application file for complete search history.

(56) References Cited

U.S. PATENT DOCUMENTS

| | | | | |
|---|---|---|---|---|
| 7,213,113 | B2 * | 5/2007 | Sahin | G06F 11/3466 711/162 |
| 7,613,599 | B2 * | 11/2009 | Bade | G06F 17/5022 703/14 |
| 7,693,974 | B2 * | 4/2010 | Huang | H04L 41/22 709/223 |

(Continued)

OTHER PUBLICATIONS

Using Discrete Event Simulation for Programming Model Exploration at Extreme-Scale: Macroscale Components for the Structural Simulation Toolkit (SST); Jeremiah J. Wilke and Joseph P. Kenny, Sandia National Laboratories, Livermore, CA, USA—Feb. 1, 2015.*

*Primary Examiner* — Francisco Aponte
(74) *Attorney, Agent, or Firm* — Womble Bond Dickinson (US) LLP

(57) ABSTRACT

A system, method, and computer program product for testing a software component by simulating a computing component interface using captured network packet information. A method may include receiving a service request comprised of one or more network packets from a software component to be tested. Responsive to receiving the service request, the method may access a data store of captured network packet information and determine that a matching service request is stored in the accessed data store. The matching service request may be comprised of one or more network packets that match the service request. The method may identify an associated response that is stored in the accessed data store. The associated response may be one or more network packets that are stored in association with the matching service request. The method then sends the associated response to the first software component.

17 Claims, 6 Drawing Sheets

(56) References Cited

U.S. PATENT DOCUMENTS

| | | | | |
|---|---|---|---|---|
| 8,335,848 B2* | 12/2012 | Wenig | ............... | G06F 11/3438 709/224 |
| 8,352,240 B2* | 1/2013 | Chow | ............... | G06F 11/3612 703/22 |
| 8,856,600 B2* | 10/2014 | Zadigian | ............... | G01R 31/28 714/724 |
| 9,003,305 B2* | 4/2015 | Matas | ............... | G06T 11/60 715/757 |
| 9,058,420 B2* | 6/2015 | Chow | ............... | G06F 11/3612 |
| 9,753,844 B2* | 9/2017 | Kripalani | ............... | G06F 11/3688 |
| 2005/0081166 A1* | 4/2005 | Stokke | ............... | G06F 8/60 715/851 |
| 2006/0117055 A1* | 6/2006 | Doyle | ............... | G06F 9/4443 |
| 2006/0253762 A1* | 11/2006 | Schalick | ............... | G01R 31/31704 714/742 |
| 2010/0114549 A1* | 5/2010 | Kolavi | ............... | G05B 19/0426 703/13 |
| 2010/0138688 A1* | 6/2010 | Sykes | ............... | H04L 41/147 714/4.1 |
| 2011/0282642 A1* | 11/2011 | Kruger | ............... | G06F 11/3664 703/27 |
| 2011/0320880 A1* | 12/2011 | Wenig | ............... | G06F 11/3414 714/39 |
| 2013/0346639 A1* | 12/2013 | Stroud | ............... | G06F 13/4004 710/14 |
| 2015/0195182 A1* | 7/2015 | Mathur | ............... | H04L 43/50 714/27 |
| 2015/0206245 A1* | 7/2015 | Basu | ............... | G06Q 40/06 705/36 R |
| 2015/0326455 A1* | 11/2015 | Hui | ............... | G06F 3/0481 715/736 |

* cited by examiner

COMPUTER IMPLEMENTED SYSTEM AND METHOD AND COMPUTER PROGRAM PRODUCT FOR TESTING A SOFTWARE COMPONENT BY SIMULATING A COMPUTING COMPONENT USING CAPTURED NETWORK PACKET INFORMATION

FIELD OF THE DISCLOSURE

Aspects of the disclosure relate to computing technology and, more particularly, to a computer implemented system and method, and computer program product, for testing a software component by simulating a computing component using captured network packet information.

BACKGROUND

In the field of software development, newly developed software components need to be tested on various hardware configurations before becoming generally available. Given the expense associated with purchasing and maintaining hardware for purposes of testing software components, prior art systems and methods exist for simulating a computing component for purposes of testing a software component. Such simulators, however, require a software development team to re-implement the application programming interfaces (API's)s and/or protocols used by the computing component to be simulated, which is time consuming and expensive. These APIs and/or protocols are then built so that they can return a known set of data to a calling software component that is being tested.

Additionally, prior art systems and methods allow for the capture and replay of network packet information sent by a software component to a computing component and received by the software component from the computing component. Such known "capture and replay" systems and methods, however, allow for replaying only the exact network packet sequence that was captured and does not permit asynchronous API access based on the captured network packet information. What is needed, therefore, is a system and method for simulating a computing component, such as a computing component of a converged infrastructure, for purposes of testing a software component that overcomes one or more of the disadvantages associated with known systems and method for doing so.

SUMMARY

A system, method, and computer program product for testing a software component by simulating a computing component interface using captured network packet information. For example, a method in accordance with some embodiments may include receiving a service request from a first software component, which is comprised of one or more network packets. The first software component may be a software component to be tested. Responsive to receiving the service request from the first software component, the method may access a data store of captured network packet information and determine that a matching service request is stored in the accessed data store of captured network packet information. The matching service request may be comprised of one or more network packets that match the service request received from the first software component. The method may identify an associated response that is stored in the accessed data store of captured network packet information. The associated response may be one or more network packets that are stored in association with the matching service request. The method then sends the associated response to the first software component.

The method also may include generating the data store of network packet information. Generating the data store of network packet information may include capturing network packet information. The captured network packet information may be a plurality of service requests and a plurality of associated responses. Each of the plurality of service requests may be one or more network packets sent by a second software component to an interface of a computing component to be simulated. Each of the plurality of associated responses may be one or more network packets sent by the interface of the computing component to be simulated to the second software component, which is in response to receiving each of the plurality of service requests from the second software component. The method also may store the plurality of service requests and the plurality of associated responses in the data store of captured network packet information.

It will be appreciated that the above summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those herein summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Figure 1:
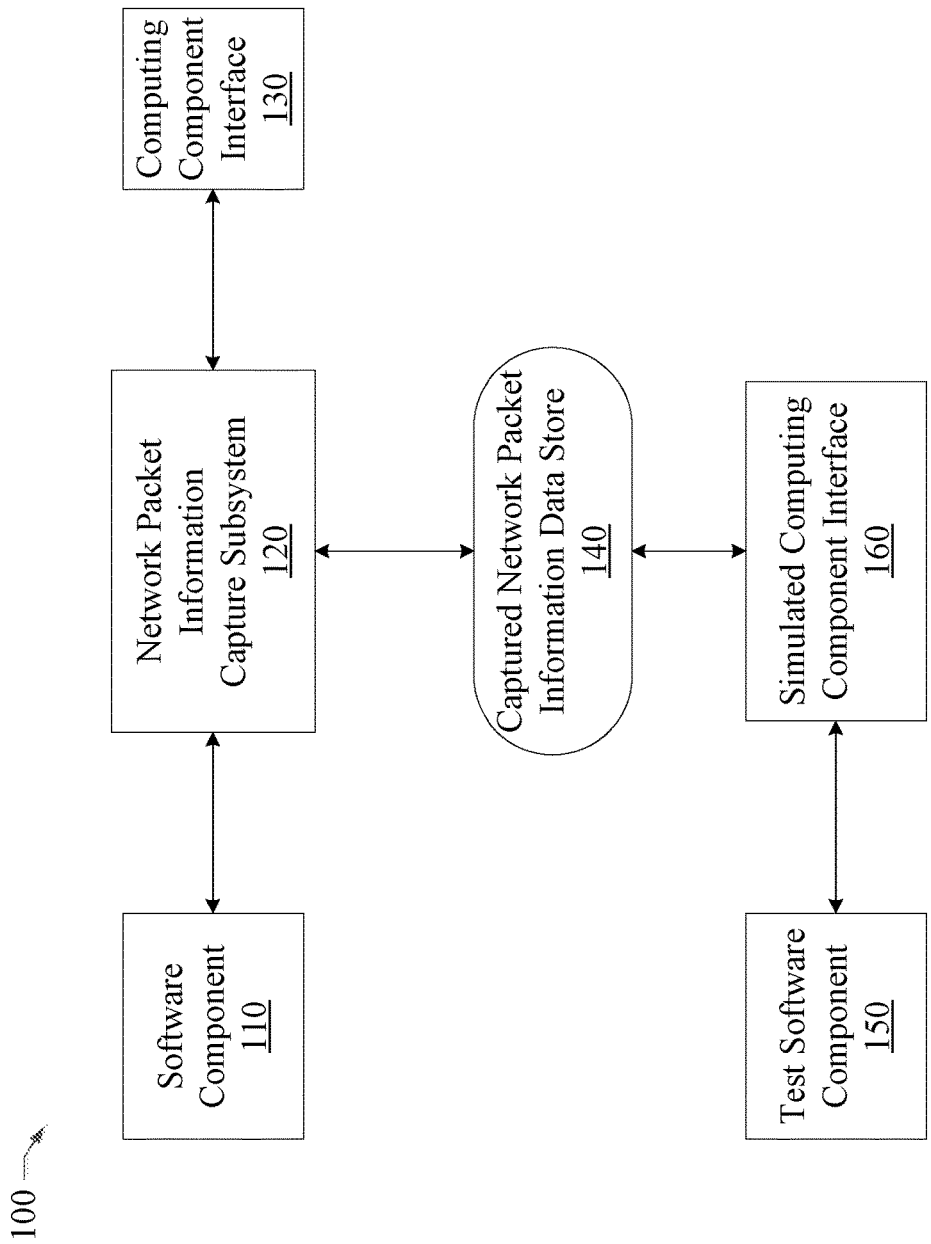

Having thus described the disclosure in general terms, reference will now be made to the accompanying drawings, which are not necessarily drawn to scale, and wherein:

FIG. 1 is a diagram of a system for testing a software component by simulating a computing component interface using captured network packet information, in accordance with some example embodiments.

Figure 2A:
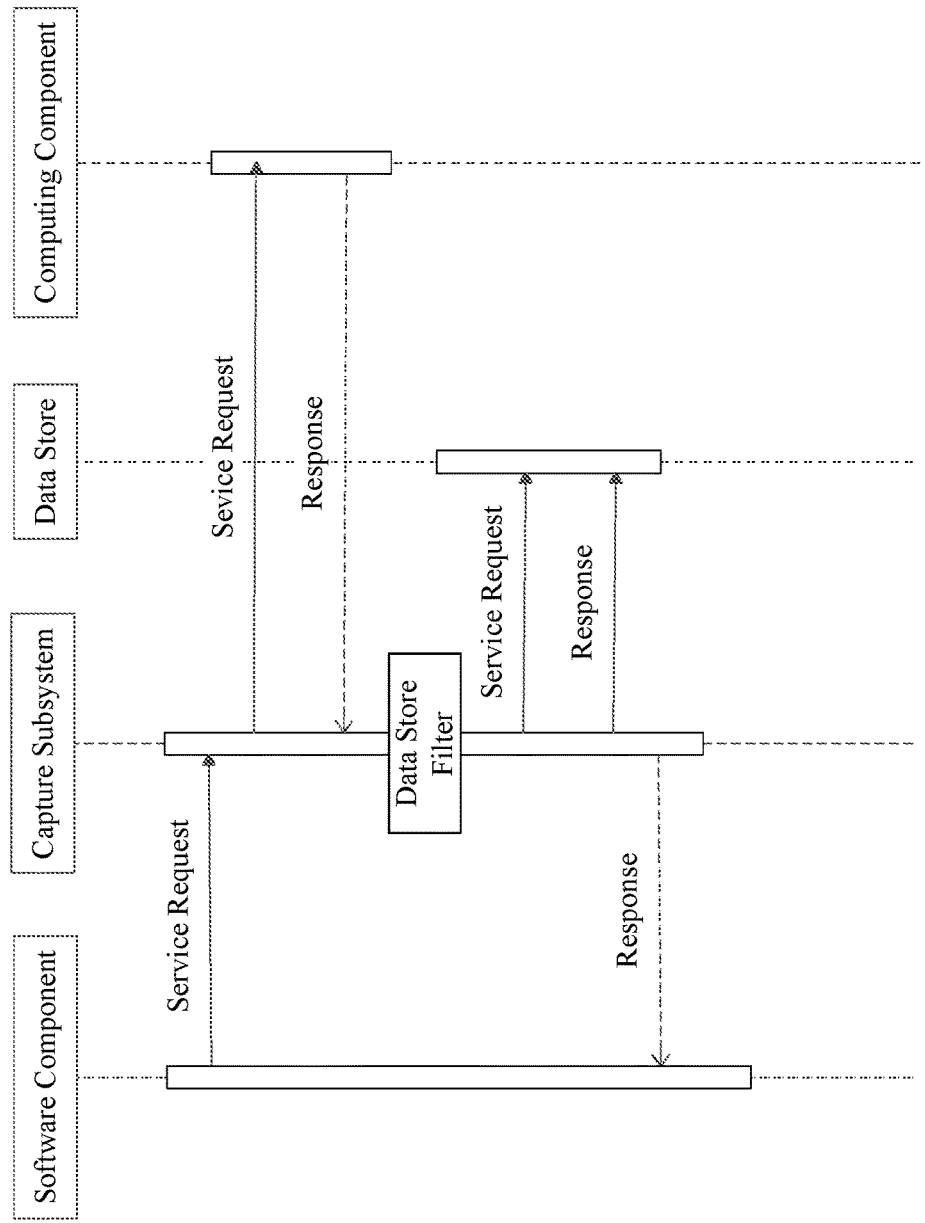

FIG. 2A is a sequence diagram of a network packet information capture subsystem, in accordance with some example embodiments.

Figure 2B:
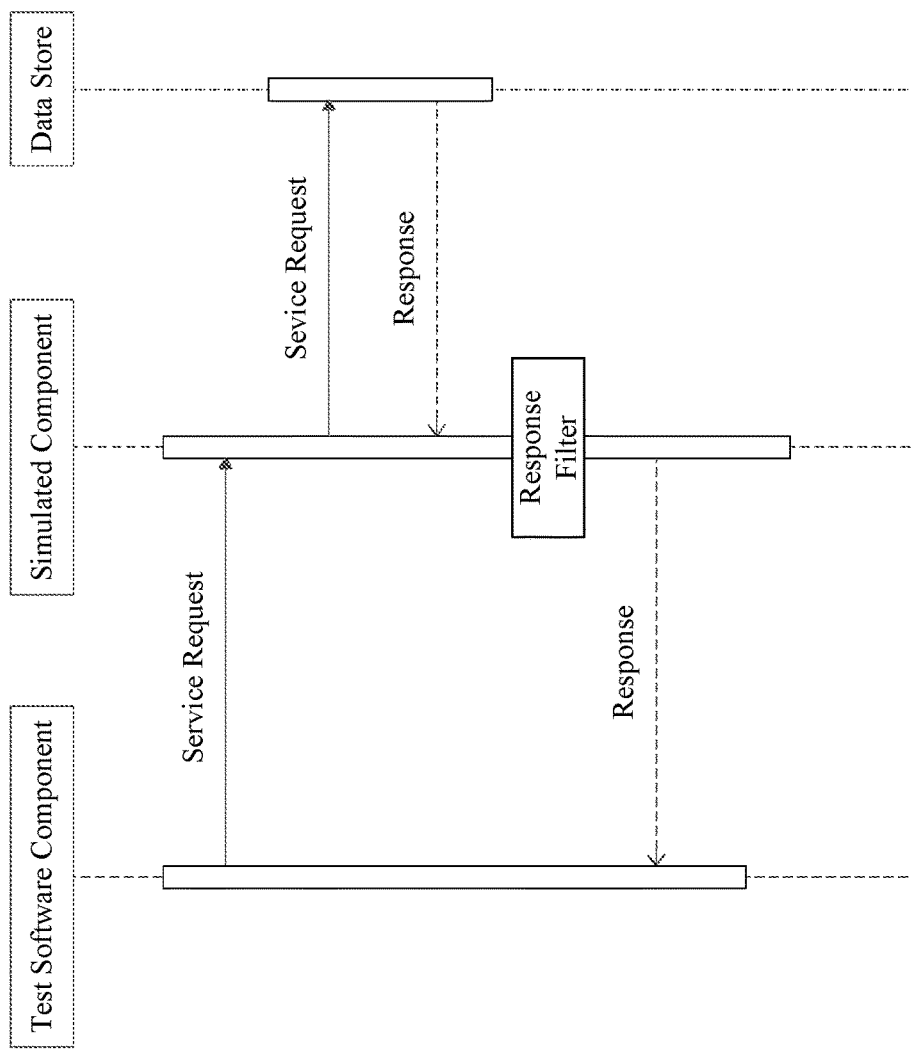

FIG. 2B is a sequence diagram of a simulated computing component interface, in accordance with some example embodiments.

Figure 3:
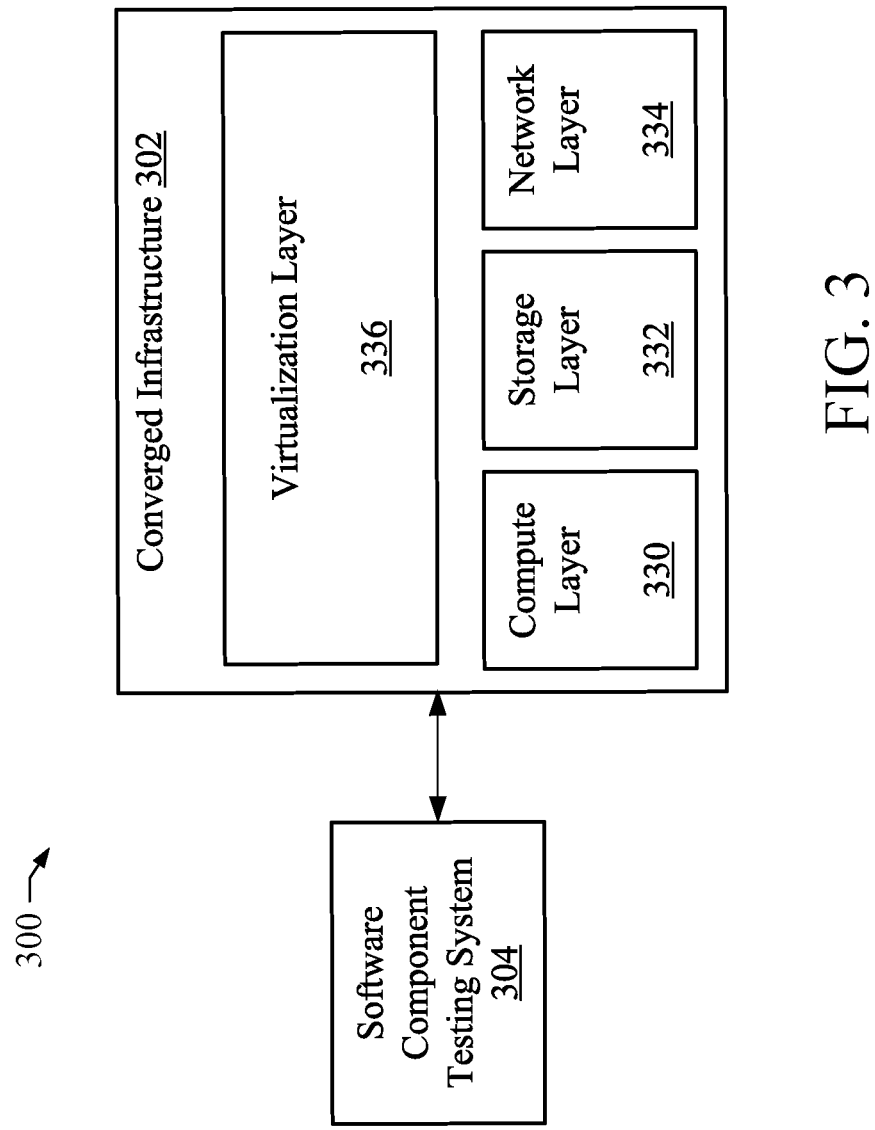

FIG. 3 is a diagram of a converged infrastructure environment, a computing component interface of which may be simulated for testing a software component using captured network packet information, in accordance with some example embodiments.

Figure 4:
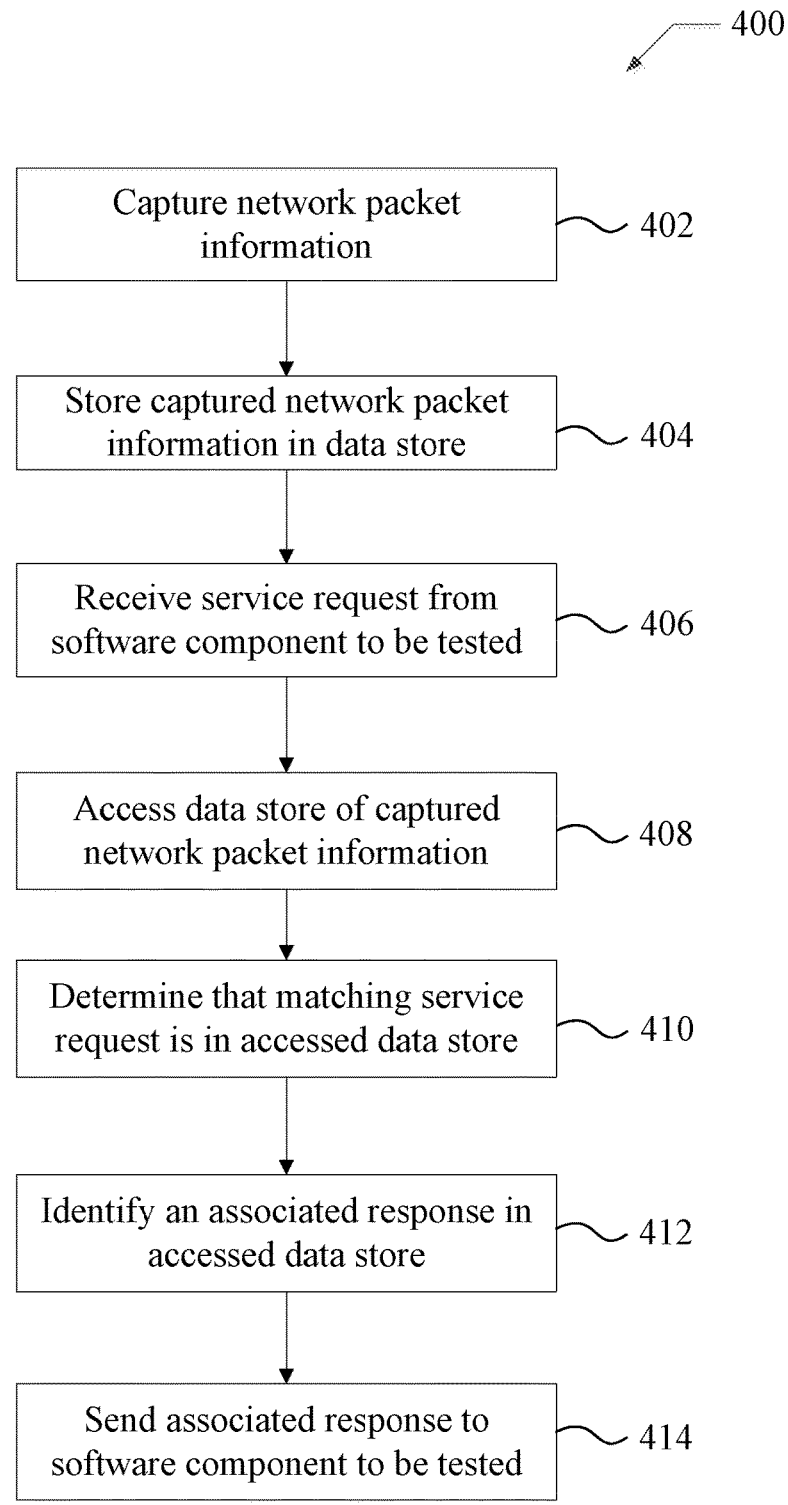

FIG. 4 is a flow diagram of a process for testing a software component by simulating a computing component interface using captured network packet information, in accordance with some example embodiments.

Figure 5:
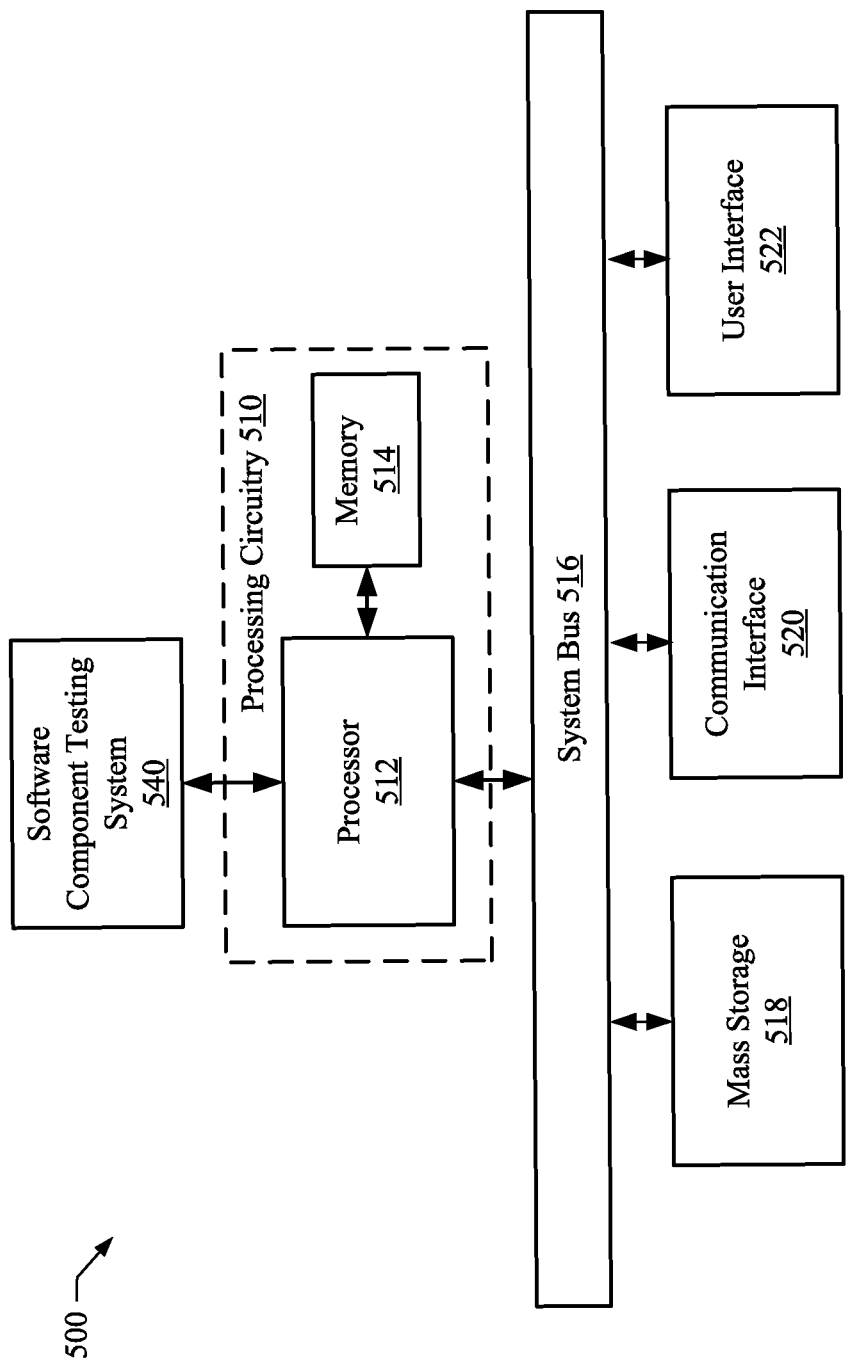

FIG. 5 is a diagram of a computing system that may be used to implement a system for testing a software component by simulating a computing component interface using captured network packet information, in accordance with some example embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 is a diagram of a system 100 for testing a software component by simulating a computing component using captured network packet information, in accordance with some example embodiments. The computing component to be simulated may be a component of a converged infrastructure, such as, compute component, a storage component or a network component.

Network packet information may be comprised of one or more network packets, which are formatted units of data carried by a packet-switched network. A network packet may include control information and a payload. The control information may include source and destination network addresses, error detection codes, and sequencing information, is typically found in packet headers and trailers. The network packet payload is the message or data, such as user data, that is being transmitted back and forth between the software component and the computing component.

System 100 uses existing network packet capture and replay systems and methods. Such existing systems and methods, however, only allow for replay of the network packets in the exact order they were captured. As set forth in more detail below, system 100 captures and interprets network packet information so that each network request and each network response to each network request can be analyzed independently. This allows for a software component to communicate with the simulated computing component and execute any API in any order after the initial capture of transport layer information.

As shown in FIG. 1, system 100 includes a software component 110 and transport network packet capture subsystem 120 and a computing component interface 130. In some example embodiments, software component 110 makes various requests, via a network, to computing component interface 130. Computing component interface 130 is configured to allow connections with software component 110 using transport layer protocols, such as Transmission Control Protocol (TCP) or User Datagram Protocol (UDP). As may be appreciated, TCP provides reliable, ordered, and error-checked delivery of a stream of octets between applications running on hosts communicating over an Internet Protocol (IP) network. UDP uses a connectionless transmission model with a minimum of protocol mechanism. It has no handshaking dialogues, and thus exposes the user's program to any unreliability of the underlying network protocol. There is no guarantee of delivery, ordering, or duplicate protection. UDP provides checksums for data integrity, and port numbers for addressing different functions at the source and destination of the datagram. With UDP, computer applications can send messages, that is, datagrams, to other hosts on an Internet Protocol (IP) network without prior communications to set up special transmission channels or data paths. UDP is suitable where error checking and correction is either not necessary or is performed in the application, avoiding the overhead of such processing at the network interface level. The invention, however, is not limited to the use of any particular transport layer protocol.

Transport layer protocols, such as the TCP and UDP, specify a source and destination port number in their segment headers. Applications implementing common services often use specifically reserved well-known port numbers for receiving service requests from clients. This process is known as listening, and involves the receipt of a request on the well-known port and establishing a one-to-one server-client dialog, using the same local port number.

Software component 110 uses an application layer protocol for transmission of the request to computing component 130 via a network. Exemplary application layer protocols that may be used include Domain Naming System (DNS), Hypertext Transport Protocol (HTTP), Telnet, Secure Shell (SSH), File Transfer Protocol (FTP), Trivial File Transfer Protocol (TFTP), Simple Network Management Protocol (SNMP), Simple Mail Transfer Protocol (SMTP), Dynamic Host Configuration Protocol (DHCP), X Windows, Remote Desktop Protocol (RDP), etc. The invention, however, is not limited to the use of any particular application layer protocol.

Network packet information capture subsystem 120 captures each request sent by software component 110 to computing component interface 130 and each response sent by computing component interface 130 to software component 110. Suitable transport layer information capture and/or replay systems, which are known to those skilled in the art, include Wireshark®, which is available from Wireshark Foundation at www.wireshark.org, PlayCap, which is available from Signal 11 Software at www.signal11.us, or Colasoft® Packet Player, which is available from Colasoft LLC of Tulsa, Okla. at www.colasoft.com. Other suitable techniques and/or applications for capturing and analyzing transport layer information include switch port or network tap, tcpdump, and proxy server. A network tap is a hardware device that provides access to data flowing across a computer network. Tcpdump is packet analyzer that allows a user to capture and display network packets, and is available at www.tcpdump.org. A proxy server is a server that acts as an intermediary for requests from clients seeking resources from other servers.

After network packet information is captured, network packet information capture subsystem 120 processes the captured network data in order to separate the captured data into one or more network streams. A network stream is one or more network requests made by the software component to the computing component and each of the network responses made by the computing component to the software component to each network request. A network stream may be as simple as a single network request and a single network response. As may be appreciated, a network stream also may be a series of network requests and network responses to those requests. In some example embodiments, a network stream may be encrypted using Transport Layer Security (TLS) or HTTP Secure (HTTPS), in which case the data will need to be decrypted in order to access the application data.

After the captured network requests and responses are separated into one or more network streams, each of the network streams may be stored in a captured network packet information data store 140. The captured network packet information data store 140 may be, in some exemplary embodiments, a relational database, such as a structured query language (SQL) database. As may be appreciated, each network request of a network stream may be stored in association with corresponding network response.

Continuing with FIG. 1, software component 150 can be tested using simulated computing component interface 160. In order to do so, simulated computing component interface 160 may be configured to allow TCP and UDP connections to the same ports that were originally used to allowed TCP and UDP connections to computing component 130. This ensures there is no change to the client. Test software component 150 uses the same application layer protocols for transmission of a service request to simulated computing component interface 160 as used by software component 110 for transmission of service requests to computing component interface 130. Simulated computing component interface 160 may be configured to listen for the same ports and protocols as computing component interface 130. While computing component interface 130 and Simulated computing component interface 160 are shown in FIG. 1 as two separate logical components, in some exemplary embodiments, computing component interface 130 and simulated computing component interface 160 may be implemented as single logical component. In such an implementation, the single logical component may be selectively operated in a "capture" mode, during which network packet information between software component 110 and computing component interface 130 are captured, or a "listening" mode, during which the single logical component listens for network packet information that is sent by test software component 150.

When a service request is sent from test software component 150 to simulated computing component interface 160, simulated computing component interface 160 determines whether a matching service request is stored in captured network information data store 140. If a matching service request is found, then simulated computing component 160 identifies the response that was captured via transport layer information capture subsystem 120 and stored in captured transport layer information data store 140 in association with the matching service request. If simulated computing component 160 identifies a response stored in captured transport layer information data store 140 in association with the matching service request, simulated computing component 160 responds to the service request from test software component 150 with the identified response.

In some exemplary embodiments, certain elements of the service request sent by test software component 150 to simulated computing component 160 may be discarded or anonymized because they are irrelevant to the process of testing software component 150 or may prevent simulated computing component 160 from determining whether a matching service request is stored in captured transport layer information data store 140. A non-limiting example of such an element of a service request is a session identifier in an HTTPS API call.

System 100 illustrated in FIG. 1, therefore, captures service requests by software component 110, and the responses to the captured service requests by computing component 130, at the transport layer, as opposed to the application layer, of the Open Systems Interconnection (OSI) Model. This allows for capturing and replaying communications between software component 110 and computing component 130 at the TCP and UDP packet level. Therefore, it is unnecessary to rely on individual higher (application) level protocol daemons, and allows for consolidation of the captured service requests and responses thereto, yielding a multithreaded, asynchronous transport layer simulation of computing component 130.

FIG. 2A is a sequence diagram of a network packet information capture subsystem, in accordance with some example embodiments. As shown in FIG. 2A, Software Component sends a message comprising one or more network packets comprising a Service Request to Capture Subsystem. In response to receiving the Service Request, Capture Subsystem sends the Service Request to Data Store for storage, and sends the Service Request to Computing Component, which is the computing component to be simulated. Responsive to receiving the Service Request, Computing Component sends a message to Capture Subsystem comprising one or more network packets comprising a Response to the Service Request. Responsive to receiving the Response, Capture Subsystem sends the Response to Data Store for storage in association with the Service Request, and also sends the response to the Software Component that initiated the Service Request. While FIG. 2A illustrates the capture and storage of a single service request and a single response thereto, the Capture Subsystem may be configured to capture and store a series of service requests and responses thereto.

Continuing with FIG. 2A, the Capture Subsystem may include a Data Store Filter. The Data Store Filter may be used to filter the information comprising the Response received by the Capture Subsystem from the Computing Component, prior to storing the Response in the Data Store. Such information filtered by the Capture Subsystem's Data Store Filter may include variable information, such as timestamp information that is included in the Response received from the Computing Component. In other words, rather than storing a specific timestamp value received from the Computing Component, the Data Store Filter may substitute a place holder value for the actual timestamp value, which is then stored in the Data Store instead of the actual timestamp value.

FIG. 2B is a sequence diagram of a simulated computing component interface, in accordance with some example embodiments. As shown in if FIG. 2B, Test Software Component sends a message comprising one or more network packets comprising a Service Request to the Simulated Component. In response to receiving the Service Request, the Simulated Component sends the Service Request to the Data Store. Responsive to receiving the Service Request, Data Store sends a message to the Simulated Component comprising one or more network packets comprising a Response to the Service Request. Responsive to receiving the Response, the Simulated Component sends the Response to the Test Software Component that initiated the Service Request. While FIG. 2A illustrates the sending and receiving a single service request and a single response thereto, the Simulated Component may be configured to send and receive a series of service requests and responses thereto.

Continuing with FIG. 2B, the Simulated Component may include a Response Filter. The Response Filter may be used to filter the information comprising the Response received by the Simulated Component from the Data Store prior to sending the Response to the Test Software Component. Such information filtered by the Simulated Component's Response Filter may include data values, such as the chassis temperature of the Simulated Component. Rather than providing a Response comprising the chassis temperature of the Computing Component illustrated in FIG. 2A, the Response Filter may allow for testing various scenarios by providing a variety of different values representing the chassis temperature of the Simulated Component.

A Data Store Filter and a Response Filter each may include one or more sets of variables to identify the circumstances under which the respective filters should be applied and how the filter operates. An exemplary set of variables may include the following: a filter identifier, a filter type identifier, a protocol identifier, a component identifier, a match identifier and modification information. For example, a Data Store Filter may have the following values:
Filter=Timestamp;
Filter type=data store filter;
Protocol=HTTP;
Component=hybrid flash storage device;
Match="request includes timestamp value"; and
Modification="substitute placeholder values for actual values."

Similarly, a Response Filter may have the following values:
Filter=Chassis Temperature;
Filter type=response filter;
Protocol=SNMP;
Component=network-attached storage device;
Match="response includes chassis temperature value"; and
Modification="set chassis temperature value to 50, 100, and 150."

Although not shown in FIG. 2A or 2B, the Capture Subsystem may include a Response Filter and the Simulated Component may include a Data Store Filter. For example, referring to FIG. 2A, if a first client, upon which the Software Component is running, initiates a connection with the Computing Component, the Software Component may provide a unique client identifier to the Computing Component. Referring to FIG. 2B, if a second client, upon which the Test Software Component is running, initiates a connection with the Simulated Component, and the second client provides a unique client identifier to the Simulated Component. In that case, the first client identifier stored in the Data Store will not match the second client identifier. However, this issue can be addressed by including Data Store Filters in both the Capture Subsystem and the Simulated Component. So, when the first client provides an identifier to the Computing Component, a Data Store Filter included in the Capture Subsystem can be configured to anonymize the first client identifier by, for example, by substituting place holder values, such as a set of zeros, for the first client identifier. Likewise, when the second client provides an identifier to the Simulated Component, a Data Store Filter included in the Simulated Component can be configured to anonymize the second client identifier by substituting the same place holder values, e.g., a set of zeros. Thus, the second client identifier will match the first client identifier.

FIG. 3 is a diagram of a converged infrastructure environment 300, a computing component interface of which may be simulated for testing a software component using captured network information, in accordance with some example embodiments. The converged infrastructure 302 may include a plurality of components, such as servers, data storage devices, network equipment, and associated software, which may be represented a single object or logical entity. In some example embodiments, the converged infrastructure is implemented by a Vblock® System available from the VCE Company, LLC of Richardson, Tex.

By way of non-limiting example, in some embodiments, the converged infrastructure may be a hyper-converged infrastructure. A hyper-converged infrastructure is characterized by a software-centric architecture that tightly integrates servers, data storage devices, network equipment, and associated software and virtualization resources, in a commodity hardware box supported by a single vendor. Hyperconvergence is related to the concept of converged infrastructure, which is an infrastructure approach where a single vendor provides a pre-configured bundle of hardware and software in a single chassis, which is represented as a single object or logical entity, with the goal of minimizing compatibility issues and simplifying management. If required, however, the hardware components of a converged infrastructure can be separated and used independently. The hardware components in a hyper-converged infrastructure, however, are so integrated that they typically cannot be separated. In some example embodiments the hyper-converged infrastructure is implemented by a VxRack™ System, available from the VCE Company, LLC of Richardson, Tex.

The converged infrastructure 302 of some embodiments may include one or more compute layer 330 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 302 may further include one or more storage layer 332 components, such as one or more storage arrays and/or other mass storage devices that may be implemented on a converged infrastructure. In some embodiments, the converged infrastructure 302 may additionally include one or more network layer 334 components, such as one or more switches and/or other network layer components that may be implemented on a converged infrastructure. For example, the network layer 334 may include components that provide switching and routing between the compute layer 330 and storage layer 332 within the converged infrastructure 302. The network layer 334 may additionally or alternatively include components that provide switching and routing between the converged infrastructure 302 and a network so as to support network communication between a component(s) of the converged infrastructure 302 and a computing platform(s) independent of the converged infrastructure 302. The components of the compute layer 330, storage layer 332, and network layer 334 may collectively provide a physical infrastructure of the converged infrastructure 302.

The converged infrastructure 302 may additionally include a virtualization layer 336, which may include one or more virtualization components configured to support one or more virtualized computing environments. The components of the virtualization layer 336 may include components embodied in software, hardware, firmware, and/or some combination thereof. For example, the virtualization layer 336 may include a hypervisor and/or other virtualization components that may be configured to create and run virtual machines and/or to otherwise virtually simulate a computing environment. In some example embodiments, the virtualization layer 336 may include and/or may be communicatively coupled with one or more management components configured to support management of the converged infrastructure 302. For example, in some embodiments, the virtualization layer 336 may include a management infrastructure, which may provide management resources for managing the converged infrastructure 302. In some such embodiments, the management infrastructure may be a separate system from the converged infrastructure, but may be connected to the converged infrastructure to allow management of the entire converged infrastructure 302. In some example embodiments, the virtualization layer 336 may utilize physical hardware resources of the compute layer 330, storage layer 332, and/or network layer 334 to support operation of one or more components of the virtualization layer 336. Additionally or alternatively, in some example embodiments, the virtualization layer 336 may include dedicated physical resources (e.g., physical hardware components) that may provide computing, storage, and/or network communication resources to one or more components of the virtualization layer 336.

It will be appreciated that the compute layer 330, storage layer 332, network layer 334, and virtualization layer 336 as illustrated in FIG. 3 and described above are provided by way of example, and not by way of limitation. In this regard, in some embodiments, aspects of the compute layer 330, storage layer 332, network layer 334, and virtualization layer 336 as described above may not be mandatory and thus some may be omitted in certain embodiments. Additionally, the converged infrastructure 302 of some embodiments may include further or different layers and/or components beyond those illustrated in and described with respect to FIG. 3.

Physical components of the converged infrastructure 302 may be communicatively coupled with each other to support operation of the converged infrastructure 302 via direct connection and/or network communication. For example, as discussed above, in some example embodiments, the network layer 334 may provide switching and routing between physical components of the converged infrastructure.

In some embodiments at least a portion of the components of the converged infrastructure 302 may be assigned addresses, such as Internet Protocol (IP) addresses and/or other network layer addresses, via which the components may be accessed by another component internal to the converged infrastructure 302 and/or via a computing device external to the converged infrastructure 302. For example, in some example embodiments, the converged infrastructure 302 and/or one or more network addressable components thereof may be accessed by an external computing device over a network to which the converged infrastructure 302 of some embodiments may be connected.

FIG. 3 also shows a software component testing system 304, which may be used to test a computing component interface of environment 300, in accordance with some example embodiments. A sample embodiment of software component testing system 304 is illustrated in more detail in FIG. 1 and is discussed in more detail in the discussion of FIG. 1 above.

FIG. 4 is a flow diagram of a process 400 for testing a software component by simulating a computing component interface using captured network packet information, in accordance with some example embodiments. One or more of the operations illustrated in FIG. 4 may be performed by a computer processor.

Process 400 may begin by generating a store of network packet information. Generating the data store of network packet information may include operation 402, in which process 400 captures network packet information. The captured network packet information may include a plurality of service requests and a plurality of associated responses. Each of the plurality of service requests may be one or more network packets sent by a software component to an interface of a computing component to be simulated. Each of the plurality of associated responses may be one or more network packets sent by the interface of the computing component to be simulated to the component in response to receiving each of the plurality of service requests from the software component. Processing may continue with operation 404.

In operation 404, process 400 may store the captured network information, which is comprised of the plurality of service requests and the plurality of associated responses, in a data store. Processing may continue with operation 406.

In some exemplary embodiments, the network packet information sent between the software component and the computing component interface to be simulated may already have been captured and stored, in which case, processing may begin with operation 406.

In operation 406, process 400 receives a service request from a software component to be tested. The service request may be one or more network packets. Processing may continue with operation 408.

In operation 408, responsive to receiving the service request from the software component to be tested, process 400 accesses the data store of captured network packet information. Processing may continue with operation 410.

In operation 410, process 400 determines whether a matching service request is stored in the accessed data store of captured network packet information. A matching service request may be one or more network packets that match the service request received from the software component to be tested. If a matching service request is stored in the accessed data store, processing may continue with operation 412.

In operation 412, process 400 identifies an associated response that is stored in the accessed data store of captured network packet information. The associated response may be one or more network packets that are stored in association with the matching service request. Processing may continue with operation 414.

In operation 414, process 400 sends the associated response to the software component to be tested, and the software component to be tested then processes the associated response.

FIG. 5 is a diagram of an example computing system 500 that may be used to implement some example embodiments of a software component testing system. The computing system 500 may be implemented on any computing device or plurality of computing devices that may be configured to implement one or more example embodiments. By way of non-limiting example, in some embodiments, the computing system 500 may be implemented on a user terminal and/or a computing platform(s) of a converged infrastructure.

The computing system may include a plurality of elements, such as processing circuitry 510, mass storage 518, communication interface 520, and user interface 522, which may be interfaced via a system bus 516. It will be appreciated that the components, devices or elements illustrated in and described with respect to FIG. 5 below may not be mandatory and thus some may be omitted in certain embodiments. Additionally, the computing system 500 of some embodiments may include further or different components, devices or elements beyond those illustrated in and described with respect to FIG. 5.

Further, while FIG. 5 illustrates an architecture including elements interfaced via the system bus 516, it will be appreciated that in some example embodiments, elements of the computing system 500 may be implemented in a distributed computing environment in which elements may be distributed across a plurality of computing devices, which may be in communication with each other, such as via a network, to provide functionality of the computing system 500. As such, in some example embodiments, elements of the computing system 500 may be communicatively coupled via a network in addition to or in lieu of the system bus 516.

The computing system 500 of some example embodiments may implement an operating system(s), such as MICROSOFT WINDOWS™, UNIX™, LINUX™, IBM z/OS™, CISCO™ INTERNETWORK OPERATING SYSTEM (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated;

however, that in some embodiments, one or more aspects of the computing system 500 may be implemented on and/or integrated with a virtualized computing system, such as may be provided by a converged infrastructure.

In some example embodiments, the computing system 500 may include processing circuitry 510 that is configurable to perform actions in accordance with one or more example embodiments disclosed herein. In this regard, the processing circuitry 510 may be configured to perform and/or control performance of one or more functionalities for testing a computing component interface of a converged infrastructure, such as converged infrastructure 302, in accordance with various example embodiments. Thus, the processing circuitry 510 may be configured to perform data processing, application execution and/or other processing and management services according to one or more example embodiments.

In some example embodiments, the processing circuitry 510 may include a processor 512 and, in some embodiments, such as that illustrated in FIG. 5, may further include memory 514. The processing circuitry 510 may be in communication with (e.g., via system bus 516) and/or otherwise control mass storage 518, communication interface 520, and/or user interface 522.

The processor 512 may be embodied in a variety of forms. For example, the processor 512 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 512 may comprise a plurality of processors. The plurality of processors may be in operative communication with each other and may be collectively configured to perform one or more functionalities to support testing a software component by simulating a computing component interface of a converged infrastructure in accordance with various embodiments. In some embodiments in which the computing system 500 is embodied as a plurality of computing devices, a plurality of processors, which may collectively form the processor 512, may be distributed across a plurality of computing devices that may be in operative communication with each other directly and/or via a network. In some example embodiments, the processor 512 may be configured to execute instructions that may be stored in a memory, such as the memory 514 and/or the mass storage 518 and/or that may be otherwise accessible to the processor 512. As such, whether configured by hardware or by a combination of hardware and software, the processor 512 may be capable of performing operations according to various embodiments while configured accordingly.

In embodiments including the memory 514, the memory 514 may include read only memory (ROM), random access memory (RAM), and/or the like. The mass storage 518 may include one or more memory and/or other storage devices, which may include fixed (e.g., a fixed hard disc drive, storage array, fixed flash memory device, and/or the like) and/or removable memory devices (e.g., a removable flash memory device, an optical disc drive, and/or other removable memory device). The mass storage 518 may provide a persistent data storage device. In some example embodiments, the mass storage 518 may be configured to provide a backup storage. The mass storage 518 may include a memory device implemented locally to the computing system 500 and/or a memory device remote to the computing system 500, which may be communicatively coupled with the computing system 500, such as via a network. In some embodiments in which the computing system 500 is embodied as a plurality of computing devices, the memory 514 and/or mass storage 518 may include a plurality of memory devices, which may be distributed across a plurality of computing devices that may be in operative communication with each other directly and/or via a network to form the computing system 500.

In some embodiments, the memory 514 and/or the mass storage 518 may provide a non-transitory computer-readable storage medium that may store computer program instructions that may be executed by the processor 512. In this regard, the memory 514 and/or mass storage 518 may be configured to store information, data, applications, instructions and/or the like for enabling the computing system 500 to carry out various functions in accordance with one or more example embodiments. Applications that may be executed by the processor 512 may also be in the form of modulated electronic signals that may be accessed via a network modem or other network interface of the computing system 500.

The computing system 500 may further include a communication interface 520. The communication interface 520 may enable the computing system 500 to communicate (e.g., over a network or other communication interface) with another computing device or system, such as the converged infrastructure 302. In this regard, the communication interface 520 may include one or more interface mechanisms for enabling communication with other devices and/or networks. As such, the communication interface 520 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 500 may include the user interface 522. It will be appreciated, however, that in some example embodiments, one or more aspects of the user interface 522 may be omitted, and in some embodiments, the user interface 522 may be omitted entirely. The user interface 522 may be in communication with the processing circuitry 510 to receive an indication of a user input and/or to provide an audible, visual, mechanical, or other output to a user. As such, the user interface 522 may include, for example, a keyboard, a mouse, a joystick, a display, a touch screen display, a microphone, a speaker, one or more biometric input devices, and/or other input/output mechanisms.

As shown in FIG. 5, in some example embodiments, a software component testing system 540 interfaces with computing system 500. As discussed above in connection with FIG. 1, the software component testing system 540 may be configured to test a software component on a simulated computing component.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, mini computers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a software component testing system, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a software component testing system is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), local area network (LAN), etc.) using any communication medium and protocols (e.g., transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VBScript, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A computer-implemented method for testing a software component by simulating an interface to a computing component interface using captured network packet information, the method comprising:
   receiving a service request from a first software component, the service request comprising one or more network packets;
   responsive to receiving the service request from the first software component, accessing a data store of captured network packet information; wherein the data store is generated by capturing network packet information, wherein the captured network packet information is comprised of a plurality of service requests and a plurality of associated responses, wherein each of the plurality of service requests is comprised of one or more network packets sent by a second software component to an interface of a computing component to be simulated, and wherein each of the plurality of associated responses is comprised of one or more network packets sent by the interface of the computing component to be simulated to the second software component in response to receiving each of the plurality of service requests from the second software component; and storing the plurality of service requests and the plurality of associated responses in the data store of captured network packet information;
   determining that a matching service request is stored in the accessed data store of captured network packet information, wherein the matching service request is comprised of one or more network packets that match the service request received from the first software component;
   identifying an associated response that is stored in the accessed data store of captured network packet information, the associated response being comprised of one or more network packets that are stored in association with the matching service request;
   sending the associated response to the first software component; and
   testing the first software component by simulation.

2. The method of claim 1, further comprising:
   processing the captured network packet information by separating the captured network packet information into one or more network information streams, wherein a network information stream is comprised of one or more service requests and the associated responses; and
   storing the one or more network information streams in the data store.

3. The method of claim 1, wherein the captured network information is encrypted by at least one of the software component and the interface of the computing component to be simulated.

4. The method of claim 1, wherein the network packet information is captured independent of a network protocol.

5. The method of claim 1, wherein the service request is unauthenticated and the associated response is a request for authentication information from the second software component.

6. The method of claim 1, wherein the interface of the computing component to be simulated is a component of a converged infrastructure environment.

7. A computer implemented system for testing a software component by simulating a computing component interface using captured network packet information, the system comprising:
 at least one processor; and
 at least one memory storing computer program code, wherein the at least one memory and stored computer program code are configured, with the at least one processor, to cause the system to at least:
  receive a service request from a first software component, the service request comprising one or more network packets;
  responsive to receiving the service request from the first software component, access a data store of captured network packet information; wherein the data store is generated by:
   capturing network packet information, wherein the captured network packet information is comprised of a plurality of service requests and a plurality of associated responses, wherein each of the plurality of service requests is comprised of one or more network packets sent by a second software component to an interface of a computing component to be simulated, and wherein each of the plurality of associated responses is comprised of one or more network packets sent by the interface of the computing component to be simulated to the second software component in response to receiving each of the plurality of service requests from the second software component; and
   store the plurality of service requests and the plurality of associated responses in the data store of captured network packet information;
  determine that a matching service request is stored in the accessed data store of captured network packet information, wherein the matching service request is comprised of one or more network packets that match the service request received from the first software component;
  identify an associated response that is stored in the accessed data store of captured network packet information, the associated response being comprised of one or more network packets that are stored in association with the matching service request;
  send the associated response to the first software component; and
  test the first software component by simulation.

8. The computer implemented system of claim 7, wherein the at least one memory and stored computer program code are configured, with the at least one processor, to further cause the system to:
 process the captured network packet information by separating the captured network packet information into one or more network information streams, wherein a network information stream is comprised of one or more service requests and the associated responses; and
 store the one or more network information streams in the data store.

9. The computer implemented system of claim 7, wherein the captured network information is encrypted by at least one of the software component and the interface of the computing component to be simulated.

10. The computer implemented system of claim 7, wherein the network packet information is captured independent of a network protocol.

11. The computer implemented system of claim 7, wherein the service request is unauthenticated and the associated response is a request for authentication information from the second software component.

12. The computer implemented system of claim 7, wherein the interface of the computing component to be simulated is a component of a converged infrastructure environment.

13. A computer program product for testing a software component by simulating a computing component using captured network information, the computer program product comprising at least one non-transitory computer-readable storage medium having program instructions stored thereon, which when executed by at least one processor, cause the at least one processor to perform a method comprising:
 receiving a service request from a first software component, the service request comprising one or more network packets;
 responsive to receiving the service request from the first software component, accessing a data store of captured network packet information; wherein the data store is generated by:
  capturing network packet information, wherein the captured network packet information is comprised of a plurality of service requests and a plurality of associated responses, wherein each of the plurality of service requests is comprised of one or more network packets sent by a second software component to an interface of a computing component to be simulated, and wherein each of the plurality of associated responses is comprised of one or more network packets sent by the interface of the computing component to be simulated to the second software component in response to receiving each of the plurality of service requests from the second software component; and
  storing the plurality of service requests and the plurality of associated responses in the data store of captured network packet information;
 determining that a matching service request is stored in the accessed data store of captured network packet information, wherein the matching service request is comprised of one or more network packets that match the service request received from the first software component;
 identifying an associated response that is stored in the accessed data store of captured network packet information, the associated response being comprised of one or more network packets that are stored in association with the matching service request;
 sending the associated response to the first software component; and
 testing the first software component by simulation.

14. The computer program product of claim 13, wherein the least one non-transitory computer-readable storage medium having program instructions stored thereon, which when executed by the at least one processor, cause the at least one processor to perform a method further comprising:

processing the captured network packet information by separating the captured network packet information into one or more network information streams, wherein a network information stream is comprised of one or more service requests and the associated responses;

and storing the one or more network information streams in the data store.

15. The computer program product of claim 13, wherein the captured network information is encrypted by at least one of the software component and the interface of the computing component to be simulated.

16. The computer program product of claim 13, wherein the network packet information is captured independent of a network protocol.

17. The computer program product of claim 13, wherein the interface of the computing component to be simulated is a component of a converged infrastructure environment.

* * * * *